May 6, 1947.                T. R. SMITH                2,420,104
                          SEAL GUARD RING
                        Filed July 22, 1943              2 Sheets-Sheet 1

INVENTOR.
Thomas R. Smith,
BY Parkinson & Lane
Attys

Witness:
Chas. R. Hursh

May 6, 1947. T. R. SMITH 2,420,104
SEAL GUARD RING
Filed July 22, 1943 2 Sheets-Sheet 2

INVENTOR.
Thomas R. Smith,
BY Parkinson & Lane
Attys

Witness:
Chas. N. Koursh.

Patented May 6, 1947

2,420,104

UNITED STATES PATENT OFFICE 2,420,104

SEAL GUARD RING

Thomas R. Smith, Newton, Iowa, assignor to The Maytag Company, Newton, Iowa, a corporation of Delaware Application July 22, 1943, Serial No. 495,703

13 Claims. (Cl. 309—23)

The present invention relates to a seal assembly and especially to a novel seal guard ring adapted to seal off the clearance opening or space between a pair of relatively movable members such as a cylinder and piston. It has been found that with various types of seals in which a resilient sealing ring or packing is mounted and carried in a groove or recess provided in one of the members and has a wiping and sealing contact with the other, when the seal operated under extremely high pressures such as in the range of approximately 3000 pounds per square inch, the resilient or rubber-like sealing material has a tendency to extrude into the narrow clearance opening provided between these members. Such extrusion results in damage to the sealing element or ring with subsequent failure to hold the pressures at which the piston is operated.

In the present novel invention damage to the sealing ring or packing due to extrusion is completely eliminated as the clearance opening between the piston and cylinder is blocked or sealed off in such manner that the resilient ring cannot be extruded into this space. To eliminate this condition the invention comprehends the provision of a seal guard ring formed of metal or other material of substantial hardness which will not extrude when subjected to the pressures employed, and which forms a barrier against which the sealing ring or packing abuts.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

Figure 4:
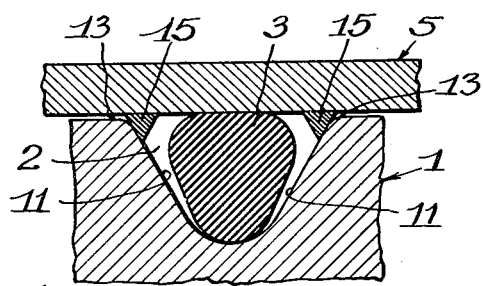
Figures 4 and 5 are views similar to Figures 2 and 3, respectively, but showing an alternate form of seal guard ring.
Figure 5:
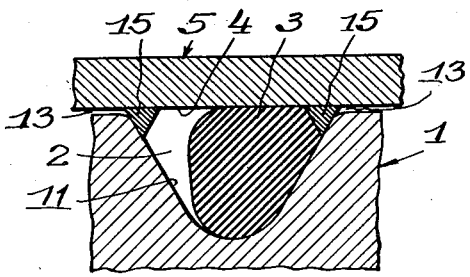
Figure 6:
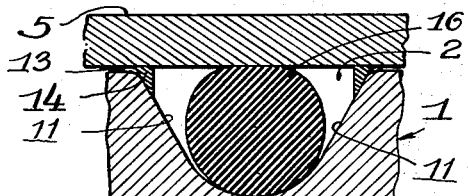
Figures 6 and 7 are views similar to Figures 2 and 3, respectively, but showing an alternate construction of sealing ring or packing.
Figure 7:
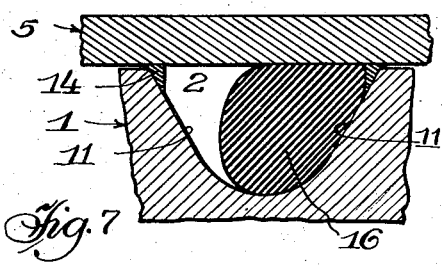
Figure 8:
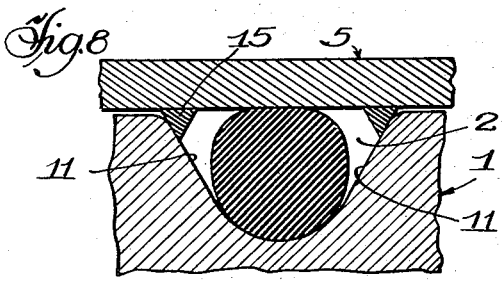
Figure 9:
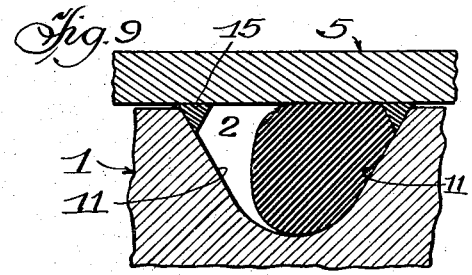

Figures 8 and 9 are views similar to Figures 6 and 7, respectively, but showing a form of seal guard ring as employed in Figures 4 and 5.

Figure 10:
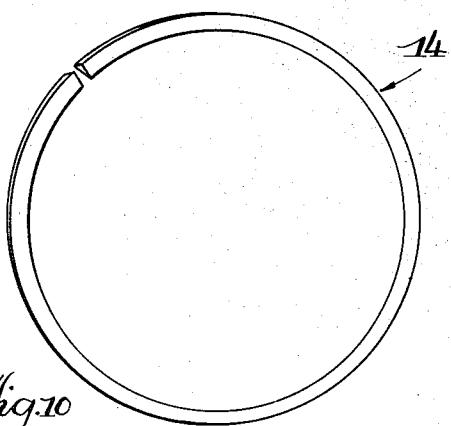

Figure 10 is a view in perspective of the seal guard rings employed in Figures 1, 2, 3, 6 and 7.

Figure 11:
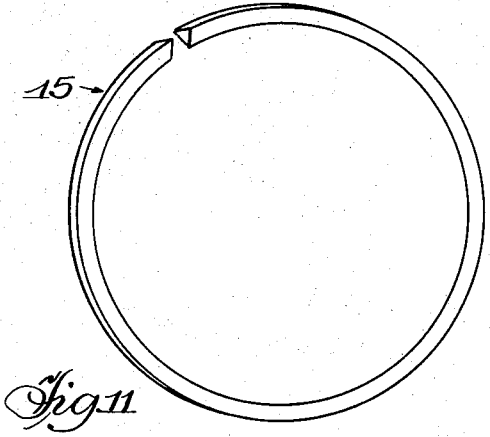

Figure 11 is a view in perspective of the seal guard ring shown in Figures 4, 5, 8 and 9.

Figure 12:
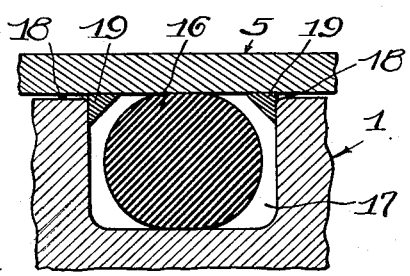

Figure 12 is a view similar to Figure 8 but showing an O-shaped sealing ring mounted in a substantially U-shaped or square groove and showing a slightly modified form of seal guard ring for use in the square groove.

Figure 13:
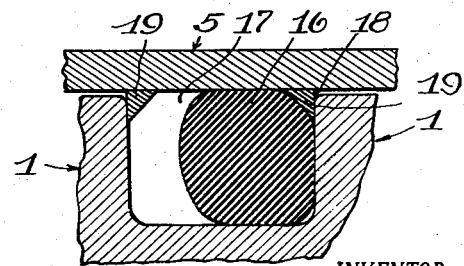

Figure 13 is a view similar to Figure 12 but showing the relation of the parts and position of the sealing ring or packing when under pressure.

Figure 1:
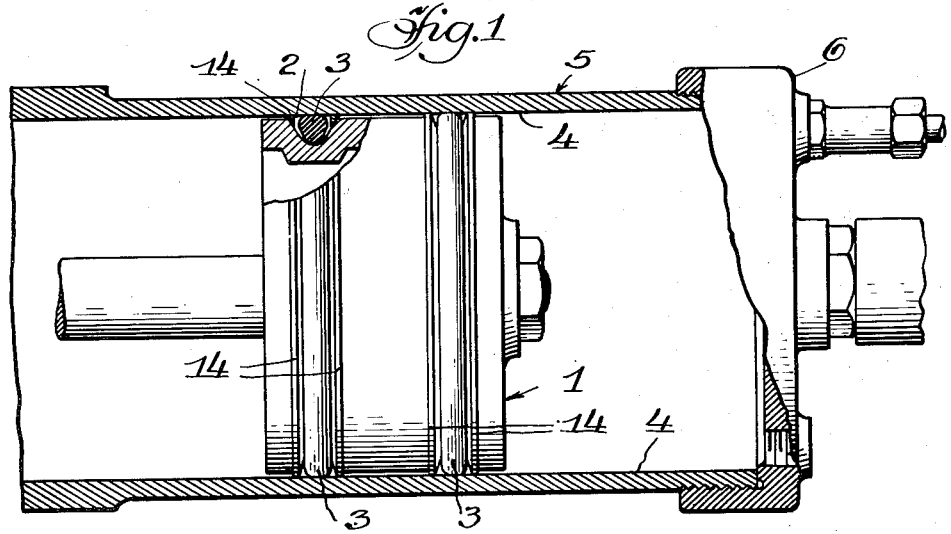
Figure 1 is a fragmentary view, part in vertical cross section and part in side elevation, of a piston and cylinder and showing one embodiment of the novel invention.

Referring more particularly to the illustrative embodiment selected to illustrate the present invention, Figure 1 of the drawings discloses the invention embodied in a piston and cylinder assembly in which a reciprocatory piston 1 is provided with one or more peripheral grooves or recesses 2 of substantially V-shape and each adapted to receive a substantially wedge-shaped resilient sealing ring or packing 3 for sealing the space between the piston and the interior wall 4 of the cylinder 5 under all conditions of operation. This resilient sealing ring or packing is preferably of a rubber or rubber-like sealing material, such as natural or compounded synthetic rubber. The cylinder is shown as provided with end cap or head 6 having the usual intake and exhaust ports for passage of the hydraulic fluid to and from one end of the cylinder.

Figure 2:
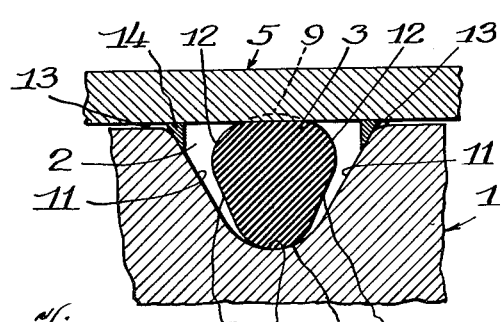
Figure 2 is an enlarged fragmentary view in vertical cross section of the sealing ring or packing, its groove or recess and the guard ring of Figure 1, and showing the sealing ring when in no-pressure condition.

As shown more clearly in Figure 2, the substantially wedge-shaped sealing ring or packing 3 has its opposite sides 7—7 disposed at an angle of approximately 45° and its vertex 8 and sealing face or surface 9 rounded or curved in a manner to effect optimum sealing action. The vertex of the sealing ring or packing 8 has a radius of curvature slightly less than but approximately conforming to the radius of curvature of the base 10 of the recess or groove 2 in which it pivots, and the opposite sides 11, 11 of the recess are disposed at an angle of approximately 60° to permit this pivoting action of the sealing ring or packing from one side of the recess to the other, depending upon the direction of applied pressure.

In order to prevent the sealing material at the rounded corners 12, 12 from being extruded into the clearance opening 13 between the outer circumference of the piston 1 and the adjacent face or inner circumference 4 of the cylinder 5 when operating under high pressures, the invention comprehends the provision of a guard ring 14 adapted to be disposed in a position to block off the clearance opening 13, and so contoured as to conform to the adjacent surfaces of the sides 11, 11 of the recess or groove and the inner circumference or adjacent wall 4 of the cylinder.

These seal guard rings 14 are preferably formed of metal or other material having a substantially greater degree of hardness than the sealing ring or packing and which material will not extrude under the application of extremely high pressures. Figure 2 shows the sealing ring or packing when under no pressure and Figure 3 shows the position and approximate contour of the sealing ring or packing and its relation with the guard ring, when high pressure is applied to the assembly.

Figure 3:
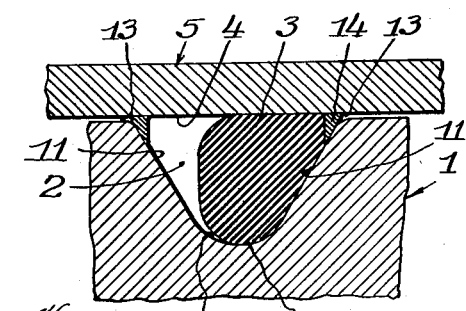
Figure 3 is a view similar to Figure 2 but showing the position of the sealing ring or packing when under pressure.

Figures 4 and 5 are similar to the disclosures in Figures 2 and 3, respectively, except for a slightly modified form of guard ring 15.

In Figures 6, 7, 8 and 9 is shown a sealing ring or packing 16 of approximately circular or O-shape in cross section embodied in a substantially V-shaped groove or recess 2 and in which the sealing ring or packing is adapted to pivot. Figures 6 and 7 show a guard ring 14 similar to that shown in Figures 2 and 3, while Figures 8 and 9 show a guard ring 15 similar to that employed in Figures 4 and 5. These guard rings 14 and 15 as shown in each of the figures, are split and formed of a relatively hard and expansible metal or other suitable material which will not extrude regardless of the pressure employed.

Figures 12 and 13 show a sealing ring or packing 16 of substantially circular or O-shape in cross section and embodied in a substantially square or channel-shaped groove or recess 17 in which the sealing ring or packing may pivot or shift laterally. In order to prevent the resilient sealing material from extruding into the space or clearance opening 18 between the piston 1 and interior 4 of the cylinder 5, a sealing guard ring 19 is employed. Like the guard rings 14 and 15, the ring 19 is split and made expansible so that its outer diameter engages and is retained in seating engagement with the adjacent face or inner circumference of the cylinder 5.

Having thus disclosed the invention, I claim:

1. In a seal assembly for sealing the space between a pair of members and in which one member is formed with a continuous recess having its opposite sides so inclined as to form an acute angle with the surface of the other member to be sealed, a resilient packing carried in the recess with its opposite sides spaced from the sides of the recess when under no or relatively low pressure and adapted to flow into a corner formed by a side of the recess and the surface of the other member to be sealed when under relatively high pressure, and a guard ring positioned within the acute angle formed at the corner for protecting the material of the packing against extrusion into this corner and the clearance opening between the adjacent surfaces of the members to be sealed when the seal is under relatively high pressure.

2. In a seal assembly for sealing the space between a pair of members such as a piston and cylinder, a circumferential substantially V-shaped recess provided in the periphery of the piston, a resilient sealing element carried in the recess and having a cross sectional area less than the cross sectional area of the recess whereby the opposite sides of the sealing element are normally spaced from the sides of the recess when under no or relatively low pressure and the sealing element moves against a side of the recess when under relatively high pressure, and a ring of substantially triangular cross section and relatively hard material placed within the corner formed by the adjacent surfaces of the piston and cylinder to prevent the material of the sealing element from being extruded into this corner when the material is distorted under the relatively high pressure.

3. A sealing guard ring adapted to protect a resilient packing ring against extrusion and damage when mounted in a circumferential and substantially V-shaped recess provided in a piston for sealing the space between the piston and a cylinder and preventing passage or leakage therethrough of hydraulic fluid under high pressure, comprising a split member of substantially triangular cross section adapted to seat within the acute angle formed by a side of the recess and adjacent surface of the cylinder to obstruct the space between the piston and cylinder whereby when the resilient packing ring is distorted under the high pressure employed, the packing ring abuts the member and is prevented from extruding into the space between the piston and cylinder.

4. A sealing guard ring adapted to protect a resilient packing ring against extrusion and damage when mounted between a piston and cylinder for sealing the space therebetween and preventing passage or leakage therethrough of hydraulic fluid under high pressure, comprising an expandible ring substantially triangular in cross section carried by the piston and adapted to obstruct the space between the piston and cylinder whereby when the resilient packing ring is distorted under the high pressure employed, the packing ring is moved into engagement with the expandible ring and is prevented from extruding into the space between the piston and cylinder.

5. A sealing guard ring adapted to protect a resilient packing ring against extrusion and damage when mounted in a circumferential, substantially V-shaped recess provided in the periphery of a piston and adapted to seal against the interior of a cylinder for sealing the space therebetween to prevent the passage or leakage of hydraulic fluid when under high pressure, comprising an expansible ring of non-extrudible material of substantially triangular cross-section positioned within the acute angle at the corner formed by an adjacent side of the recess and the contiguous surfaces of the piston and cylinder, for preventing extrusion of the resilient material of the packing ring under high pressure.

6. Means for protecting a resilient packing ring against extrusion and damage when mounted in a circumferential, substantially V-shaped recess provided in the inner of a pair of concentric members and adapted to maintain a sealing contact with the outer of the concentric members for sealing the space therebetween to prevent the passage or leakage of hydraulic fluid when under high pressure, comprising an expansible metal ring of substantially triangular cross-section positioned within the acute angle at the corner formed by an adjacent side of the recess and the contiguous surfaces of the concentric members for preventing extrusion of the resilient material of the packing ring under high pressure.

7. In a fluid seal packing, the combination of a member having a circumferential groove therein, said groove having angular side walls, a resilient packing ring of deformable material in said groove, and a radially flexible ring in said groove in engagement with said packing ring, said radially flexible ring being triangular in cross-section with the widest portion of the flexible ring outwardly of the groove and with one of the angular faces thereof against the adjacent angular side wall of the groove.

8. A sealing ring assembly comprising a resilient ring of deformable material and a radially flexible metal ring on each side of said resilient ring, said flexible ring being triangular in cross-section.

9. In a fluid seal packing, the combination of a member having a circumferential groove therein, said groove having outwardly angular side walls, a resilient packing ring of deformable material in said groove, and a radially flexible metal ring on each side of said packing in said groove, said flexible rings each being triangular in cross-section with one of the angular faces thereof against the adjacent angular side wall of the groove and the opposite angular face engageable by said resilient ring.

10. In a fluid seal packing, the combination of a member having a circumferential groove therein, said groove having angular side walls, a resilient packing ring of deformable material in said groove, a radially flexible ring in said groove on each side of said resilient packing ring, each of said flexible rings being triangular in cross-section and having an angular face in engagement with the adjacent end of the groove and having an opposite angular face engageable by said resilient ring.

11. In a fluid seal packing for use between a stationary member and a movable member, one of said members having a circumferential groove therein, a resilient packing ring of deformable material in said groove and a radially flexible ring on each side of said resilient ring of deformable material in said groove, said flexible rings being triangular in cross-section and having an angular face in engagement with the adjacent side wall of the groove, and having an opposite angular face engageable by the resilient ring and having a flat face engageable with the face of the other member.

12. In a fluid seal packing for use between two relatively movable members, an annular groove in one member, a resilient packing ring of deformable material in said groove engageable with the other member, and a radially flexible ring having a triangular cross-section disposed between an end wall of said annular groove and said resilient packing ring, said flexible ring having greater resistance to extrusion than the said resilient packing ring.

13. In a seal assembly for sealing the space between a pair of relatively movable members one of which is provided with an annular groove, a resilient packing carried in the groove and having sealing contact with the other member, and a radially extensible guard ring substantially triangular in cross-section and carried within the groove for preventing extrusion of the packing into the space between said members.

THOMAS R. SMITH.

REFERENCES CITED

The following references are of record in the file of this patent:

UNITED STATES PATENTS

| Number | Name | Date |
|---|---|---|
| 1,328,182 | Miller | Jan. 13, 1920 |
| 1,612,038 | Miller | Dec. 28, 1928 |
| 1,612,039 | Miller | Dec. 28, 1928 |
| 2,314,683 | Berry | Mar. 23, 1943 |
| 2,019,757 | Loweke | Nov. 5, 1935 |
| 2,276,027 | Dick | Mar. 10, 1942 |
| 2,081,040 | King | May 18, 1937 |
| 934,125 | Young | Sept. 14, 1909 |
| 1,481,160 | Switzer | Jan. 15, 1924 |
| 2,349,170 | Jackman | May 16, 1944 |
| 2,368,744 | Carey | Feb. 6, 1945 |
| 2,060,847 | Bowen | Nov. 17, 1938 |